United States Patent [19]
Kim et al.

[11] Patent Number: 6,044,167
[45] Date of Patent: Mar. 28, 2000

[54] METHOD FOR VERIFYING THE ACCURACY OF AN ELECTRONIC MAP USING AN IRREGULAR UNIT OBJECT VERIFICATION ALGORISM

[75] Inventors: Sung Ryong Kim; Young Man Kim; Song Hoon Baik; Hyo Sil Kim; Jae Woo Jeong, all of Taejeon, Rep. of Korea

[73] Assignee: Korea Telecommunication Authority, Seoul, Rep. of Korea

[21] Appl. No.: 08/863,319

[22] Filed: May 27, 1997

[30] Foreign Application Priority Data

May 27, 1996 [KR] Rep. of Korea ..................... 96-17999

[51] Int. Cl.$^7$ ..................................... G06K 9/00

[52] U.S. Cl. ..................... 382/113; 382/202; 382/218; 345/435

[58] Field of Search ..................... 382/113, 109, 382/197, 202, 209, 218, 219; 345/435

[56] References Cited

U.S. PATENT DOCUMENTS

| | | | |
|---|---|---|---|
| 5,467,411 | 11/1995 | Tanaka et al. | 382/113 |
| 5,509,113 | 4/1996 | Takakura et al. | 395/142 |
| 5,559,707 | 9/1996 | DeLorme et al. | 364/443 |
| 5,761,328 | 6/1998 | Solberg et al. | 382/113 |

*Primary Examiner*—Matthew C. Bella
*Attorney, Agent, or Firm*—Merchant & Gould, P.C.

[57] ABSTRACT

A method for automatically verifying the accuracy of an electronic map by an algorism which is adapted to verify irregular unit objects on the electronic map, thereby reducing the verification time and costs while obtaining improved verification accuracy. The method includes the steps of calculating a desired number of unit straight lines to be included in a broken line, overlapping an image, which is indicative of raster data transformed from vector data obtained based on original raster data of an original map, with an image indicative of the original raster data, thereby calculating the number of overlapping unit straight lines, and verifying the accuracy of the electronic map, based on the calculated results along with desired limitations associated with those results.

2 Claims, 5 Drawing Sheets

METHOD FOR VERIFYING THE ACCURACY OF AN ELECTRONIC MAP USING AN IRREGULAR UNIT OBJECT VERIFICATION ALGORISM

BACKGROUND OF THE INVENTION

1. Field of the Invention

The present invention relates to a method for verifying the accuracy of an electronic map established in a geographic data system, and more particularly to a method for automatically verifying the accuracy of such an electronic map by an algorism which is adapted to verify irregular unit objects on the electronic map.

2. Description of the Prior Art

The electronic map is well known and is produced by scanning an original map previously prepared, thereby obtaining raster data about the original map, and then digitizing straight-line components of the raster data, thereby obtaining vector data. For such an electronic map produced in accordance with the above procedure, it is necessary to verify whether or not the electronic map sufficiently reflects information included in raster data. Such a verification between the original map and the electronic map has been accomplished by observing those two data through the naked eye of the verifier, thereby comparing those two data with each other, However, this verification method is problematic in that it requires a lengthened verification time and increased costs while providing low accuracy. In order to solve such problems, the present invention provides an automatic verification method. In accordance with this automatic verification method, the verification of an electronic map is carried out by comparing raster data, transformed from vector data obtained based on original raster data about irregular unit objects and stored in an electronic map database, with the original raster data. Accordingly, the present invention provides an efficient automatic electronic map verification method.

SUMMARY OF THE INVENTION

An objective of the invention is to solve the problem involved in the conventional electronic map verification using a visual test, and to provide a method for automatically verifying the accuracy of an electronic map by an algorism which is adapted to verify irregular unit objects (broken lines and symbol-affixed lines) on the electronic map.

In accordance with one aspect of the present invention, a method for verifying the accuracy of an electronic map is provided and comprises the steps of: calculating a desired number of unit straight lines to be included in a broken line; overlapping an image, which is indicative of raster data transformed from vector data obtained based on original raster data of an original map, with an image indicative of the original raster data, thereby calculating the number of overlapping unit straight lines; and verifying the accuracy of the electronic map, based on the calculated results along with the desired limitations associated with those results.

In accordance with another aspect of the present invention, a method for verifying the accuracy of an electronic map is provided and comprises the steps of: determining whether a symbol-affixed line is a symmetric line or an asymmetric line, thereby defining a figure which may receive a symbol; calculating the number of symbols of the symbol-affixed line received in the defined figure during a movement of the figure along the symbol-affixed line; calculating an ideal number of symbols; and verifying the accuracy of the electronic map, based on the calculated results along with desired limitations associated with those results.

BRIEF DESCRIPTION OF THE DRAWINGS

Other objectives and aspects of the invention will become apparent from the following description of embodiments with reference to the accompanying drawings in which.

DETAILED DESCRIPTION OF THE PREFERRED EMBODIMENTS

Irregular unit objects indicated on electronic maps are classified into broken lines and symbol-affixed lines. The broken lines include dotted lines. The symbol-affixed lines are provided with a variety of symbols such as a railroad symbol.

Figure 1:
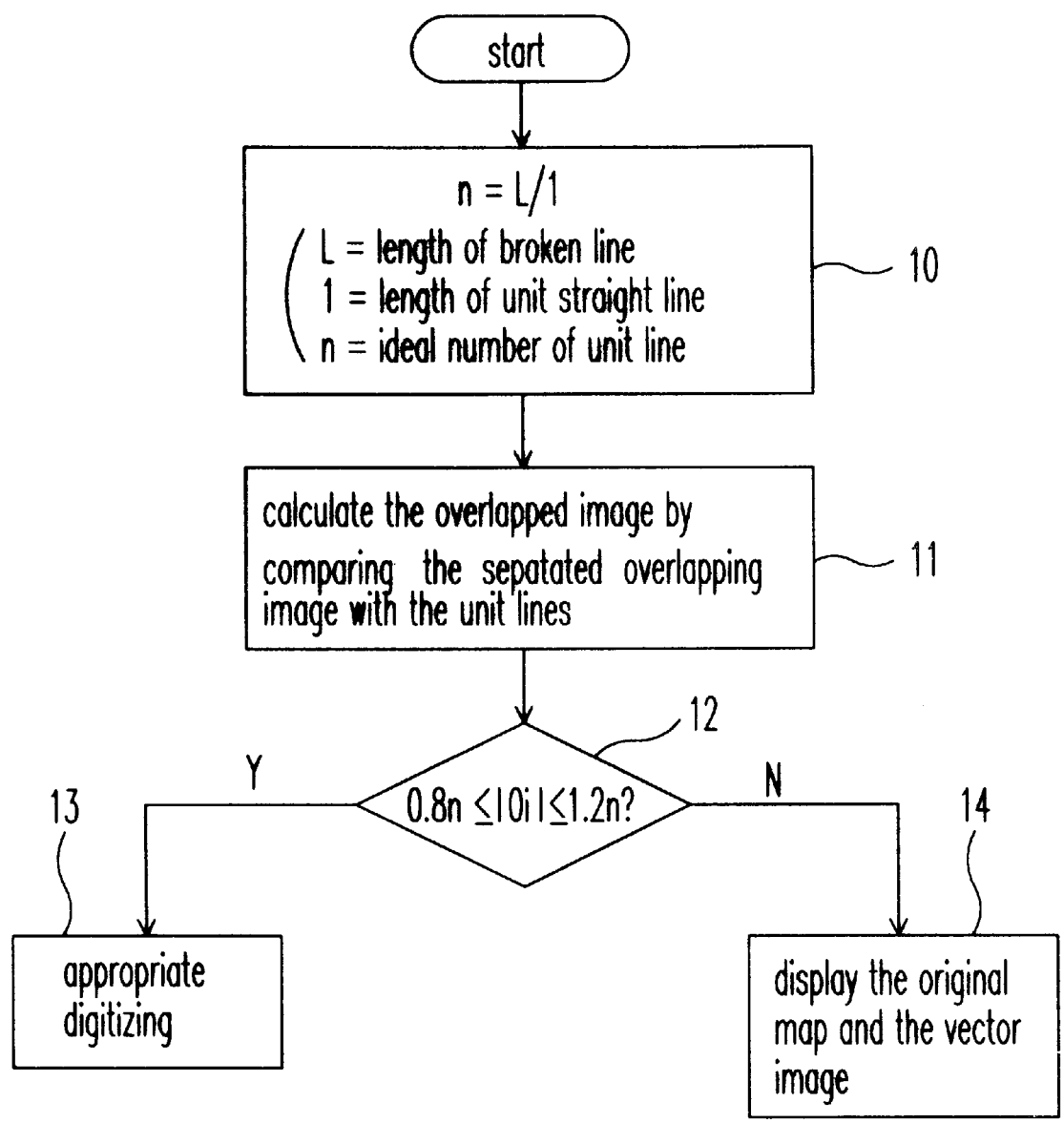
FIG. 1 is a flow chart illustrating a method for verifying irregular unit objects of a broken line in accordance with the present invention.

FIG. 1 illustrates a method for verifying irregular unit objects of an electronic map, in particular, a broken line, in accordance with an embodiment of the present invention.

Broken lines have a geometrical characteristic in that they extends in a discontinuous manner while having a certain length and a certain thickness, and in that neighboring unit straight lines thereof have no connection therebetween. Such broken lines are used in various forms to indicate roads, lanes, tunnels, and administrative boundaries, etc., being constructed. A broken line may be ideally defined as a plurality of unit straight lines aligned with one another to a certain length. If it is assumed that such a broken line has a length of "L", and each unit straight line thereof has a length of "l", then the ideal number n of unit straight lines on the length L of the broken line is "L/l" (n=L/l) (Step 10). Accordingly, where a margin having a length substantially corresponding to one unit straight line is given at the start point of the broken line, the ideal number n of unit straight lines on the broken line is "n±1".

Figure 2:
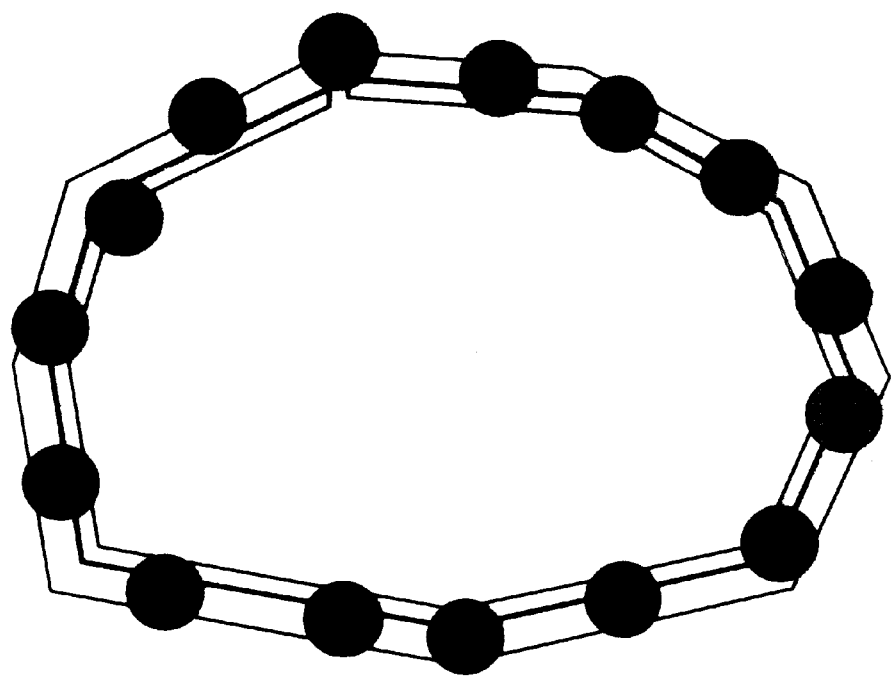
FIG. 2 is a schematic view illustrating the overlap between original raster data of an original map and raster data transformed from vector data based on the original raster data.

The number of unit straight lines can be derived in the following manner. First, an image obtained after transforming a vector line (data) into raster data is overlapped with the raster image of an original map. The raster data of the original map has a typical data size of two or three pixels. The raster data transformed from the vector data has a data size (typically, a one-pixel size) smaller than that of the original raster data so that it may be included in the original raster data. Thereafter, the number of unit straight lines of the vector data (transformed into raster data) overlapping with the line of the original raster image is calculated (Step 11) (FIG. 2). Where it is assumed that "R(li)" represents a raster image indicative of the vector data line li, and "Ci" represents the raster image indicative of the unit straight lines of the original map, the overlapping image is defined by "Oi=R(li) ∪ Ci". Based on such a definition, the accuracy of the broken line can be calculated by comparing the number of separated overlapping images Oi, namely, the number of overlapping unit straight lines in the image data, with the ideal number of unit straight lines (n=L/1) (Step 12). A limitation is provided with respect to the accuracy of the broken line. Preferably, the limitation is "0.8n ≦|Oi|≦1.2n ". When the accuracy of the broken line is calculated as being within the limitation, it is regarded that an appropriate digitizing operation is carried out for the broken line (Step 13). Where it is determined by the above verification that an error has occurred, the raster image of the original map and the raster image based on the vector image are displayed on a screen in such a manner that they are distinguished from each other by different colors while being zoomed, so as to make the verifier recognize the error correctly (Step 14).

Figure 3:
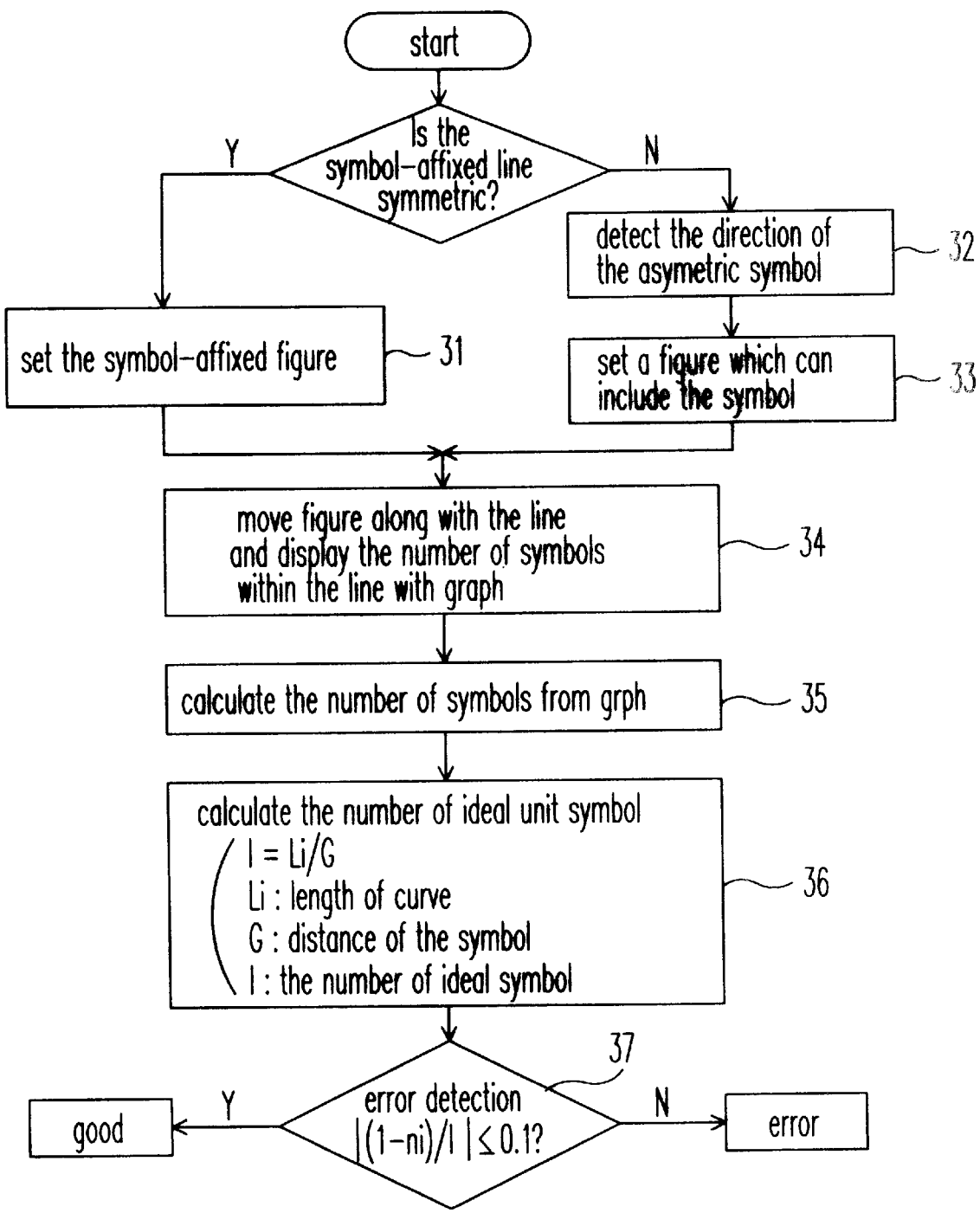
FIG. 3 is a flow chart illustrating a method for verifying irregular unit objects of a symbol-affixed line in accordance with the present invention.

FIG. 3 illustrates a method for verifying irregular unit objects of an electronic map, in particular, a symbol-affixed line, in accordance with another embodiment of the present invention.

Typically symbol-affixed lines are used to indicate railroads, embankments, and railroads, etc., being in constructed.

The verification of a symbol-affixed line is carried out in different manners in accordance with whether or not the symbol-affixed line is laterally symmetric with respect to the center thereof, respectively (Step 30). Of course, the verification is performed using raster data transformed from vector data. Where the symbol-affixed line is laterally symmetric, a figure, which may receive a symbol, is set (Step 31). Where the symbol-affixed line is indicative of a railroad, the symbols may be crossties. Where the symbol affixed line is laterally asymmetric, it is determined which lateral portion of the line includes symbols (Step 32), In this case, a figure is set which is adapted to check only the line portion including the symbols (Step 33). To simplify the explanation, the following description will be made in conjunction with the case in which the figure has a circular shape. It is unnecessary for the figure to have a completely circular shape. The figure may have a shape similar to a circle. The number of unit straight lines can be derived in the following manner. The number of symbols received in the circle is calculated while moving the circle along the line. The calculated number of symbols is indicated using a graph (Step 34). In the graph, the number of peaks along the y-axis is simply the number of unit symbols (crossties) (Step 35).

Figure 4:
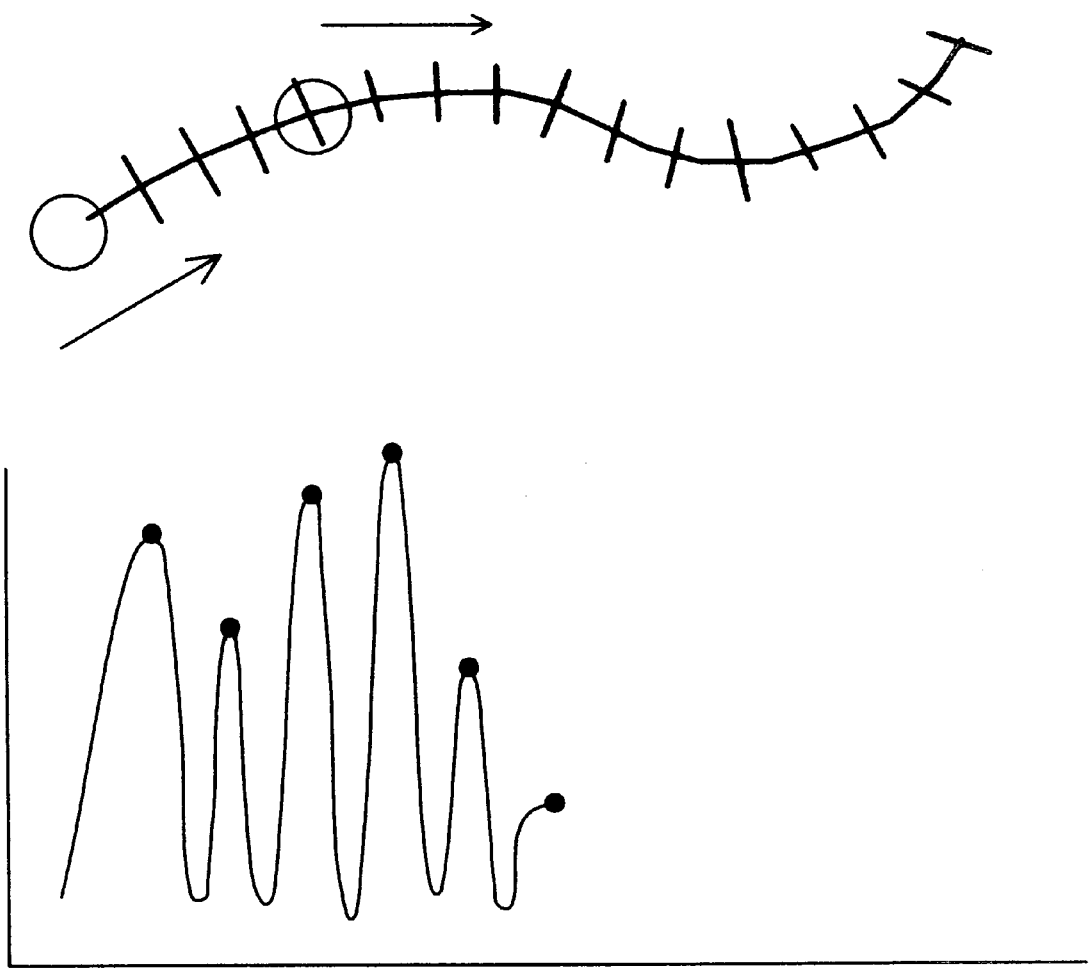
FIG. 4 is a schematic view illustrating a verification for a symmetric symbol-affixed line in accordance with the present invention.
Figure 5:
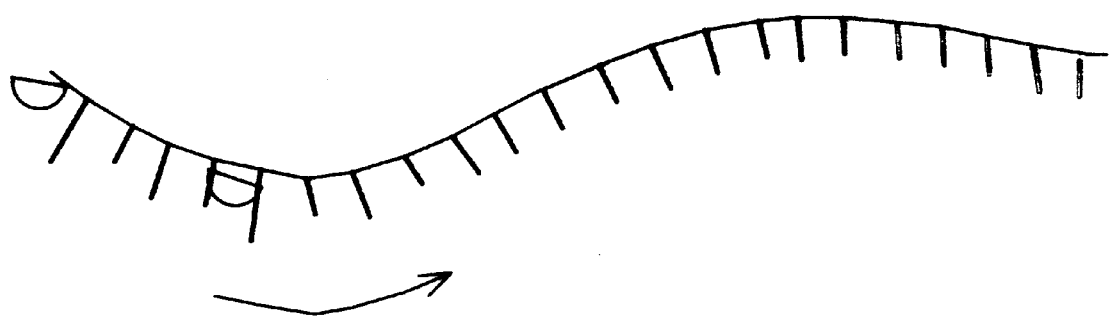
FIG. 5 is a schematic view illustrating a verification for an asymmetric symbol-affixed line in accordance with the present invention.

FIG. 4 illustrates a verification for a symmetric symbol-affixed line using a circle whereas FIG. 5 illustrates a verification for an asymmetric symbol-affixed line using a semicircle. FIGS. 4 and 5 indicate that the y-axis value increases gradually as the circle or semicircle receives a symbol therein at a gradually increasing rate, When the circle or semicircle completely receives the symbol, the y-axis value reaches a peak. On the other hand, the y-axis value decreases from the peak as the symbol separates gradually from the circle or semicircle.

Where it is determined from the raster data of the original map that the symbol-affixed line has a length of "Li", the actual number of unit symbols is "ni", and the standard distance between adjacent unit symbols is "G", the ideal number I of unit symbols is "Li/G" (Step 36). This number of unit symbols may have a difference of ±1 in accordance with the position of a unit symbol at the start portion of the line and a slight margin given at the and portion of the line.

Accordingly, the accuracy of the electronic map is carried out by comparing the calculated number of unit symbols, I, with the actual number of unit symbols, ni. A limitation is provided with respect to the accuracy of the symbol-affixed line. Preferably, the limitation is "|(I−ni)/l|≦0.1". When the accuracy of the broken line is calculated as being within the limitation, it is regarded that an appropriate digitizing operation has been carried out for the symbol-affixed line (Step 37).

As is apparent from the above description, the present invention provides a method for automatically verifying the accuracy of an electronic map by an algorism which is adapted to verify irregular unit objects on the electronic map, thereby reducing the verification time and costs while obtaining improved verification accuracy.

What is claimed is:

1. A method for verifying the accuracy of an electronic map, comprising the steps of:

calculating a desired number of unit straight lines to be included in a broken line, wherein a limitation of the number of unit straight lines is "0.8n≦|Oi|≦1.2n" where n is an ideal number of unit straight lines and Oi is a number of separated images used for calculating the accuracy of the broken line;

overlapping an image, which is indicative of raster data transformed from vector data obtained based on original raster data of an original map, with an image indicative of the original raster data, thereby calculating the number of overlapping unit straight lines; and, verifying the accuracy of the electronic map, based on the calculated results along with desired limitations associated with those results.

2. The method in accordance with claim 1, wherein the transformation of the raster data from the vector data is carried out in such a manner that the raster data has a data size including a smaller number of pixels than that of the original raster data so as to execute the step of overlapping the image indicative of the raster data transformed from the vector data with the image indicative of the original raster data, thereby calculating the number of overlapping unit straight lines.

* * * * *